(12) United States Patent  
Matsushita et al.

(10) Patent No.: US 12,535,510 B2  
(45) Date of Patent: Jan. 27, 2026

(54) CURRENT DETECTION DEVICE, CURRENT SENSOR, AND ELECTRIC POWER CONVERSION DEVICE

(71) Applicant: DENSO CORPORATION, Kariya (JP)

(72) Inventors: Junya Matsushita, Kariya (JP); Yohei Imai, Kariya (JP)

(73) Assignee: DENSO CORPORATION, Kariya (JP)

( * ) Notice: Subject to any disclaimer, the term of this patent is extended or adjusted under 35 U.S.C. 154(b) by 164 days.

(21) Appl. No.: 18/480,131

(22) Filed: Oct. 3, 2023

(65) Prior Publication Data

US 2024/0027502 A1 Jan. 25, 2024

Related U.S. Application Data

(63) Continuation of application No. PCT/JP2022/013979, filed on Mar. 24, 2022.

(30) Foreign Application Priority Data

Apr. 9, 2021 (JP) .................. 2021-066705

(51) Int. Cl.
| | |
|---|---|
| *G01R 19/00* | (2006.01) |
| *G01D 5/14* | (2006.01) |
| *G01R 15/14* | (2006.01) |
| *G01R 15/20* | (2006.01) |
| *G01R 33/07* | (2006.01) |
| *G01R 33/09* | (2006.01) |

(52) U.S. Cl.
CPC ......... *G01R 19/0092* (2013.01); *G01R 33/07* (2013.01); *G01R 33/09* (2013.01)

(58) Field of Classification Search
CPC ........ G01R 19/00; G01R 33/07; G01R 33/09; G01R 15/14; G01R 15/20; G01D 5/14
See application file for complete search history.

(56) References Cited

U.S. PATENT DOCUMENTS

| | | | |
|---|---|---|---|
| 2011/0221430 A1* | 9/2011 | Ito .................... | G01R 15/207 |
| | | | 324/244 |
| 2019/0234996 A1* | 8/2019 | Nomura ............... | H01L 23/053 |

FOREIGN PATENT DOCUMENTS

| | | |
|---|---|---|
| JP | 2002-243766 A | 8/2002 |
| JP | 2007-205863 A | 8/2007 |

(Continued)

*Primary Examiner* — Neel D Shah  
(74) *Attorney, Agent, or Firm* — Oliff PLC

(57) ABSTRACT

A current detection device detects an electric current. The current detection device includes a first conducting portion, a second conducting portion, and a current sensor. An electric current flows through the first conducting portion in a specific direction. The second conducting portion is provided at a position separated from the first conducting portion in the specific direction and through which an electric current flows in the specific direction. The current sensor detects an electric current flowing through the first conducting portion. The current sensor is located at a position aligned with the first conducting portion in an orthogonal direction orthogonal to the specific direction and separated from the second conducting portion in the specific direction. The current sensor includes a sensor element which detects a magnetic flux generated by the electric current flowing through the first conducting portion and an element protector which protects the sensor element.

12 Claims, 7 Drawing Sheets

(56) References Cited

FOREIGN PATENT DOCUMENTS

| | | | |
|---|---|---|---|
| JP | 2009-222696 | A | 10/2009 |
| JP | 2013-044705 | A | 3/2013 |
| JP | 2015-184175 | A | 10/2015 |
| JP | 2016-099111 | A | 5/2016 |
| JP | 2021-025832 | A | 2/2021 |

\* cited by examiner

CURRENT DETECTION DEVICE, CURRENT SENSOR, AND ELECTRIC POWER CONVERSION DEVICE

CROSS REFERENCE TO RELATED APPLICATIONS

The present application is a continuation application of International Patent Application No. PCT/JP2022/013979 filed on Mar. 24, 2022, which designated the U.S. and claims the benefit of priority from Japanese Patent Application No. 2021-066705 filed on Apr. 9, 2021. The entire disclosures of all of the above applications are incorporated herein by reference.

TECHNICAL FIELD

The present disclosure relates to a current detection device, a current sensor, and an electric power conversion device.

BACKGROUND

A current sensor detects an electric current.

SUMMARY

According to at least one embodiment, a current detection techniques detects an electric current. The current detection techniques includes a first conducting portion, a second conducting portion, and a current sensor. An electric current flows through the first conducting portion in a specific direction. The second conducting portion is provided at a position separated from the first conducting portion in the specific direction and through which an electric current flows in the specific direction. The current sensor detects an electric current flowing through the first conducting portion.

The current sensor is located at a position aligned with the first conducting portion in an orthogonal direction orthogonal to the specific direction and separated from the second conducting portion in the specific direction. The current sensor includes a sensor element which detects a magnetic flux generated by the electric current flowing through the first conducting portion and an element protector which protects the sensor element.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
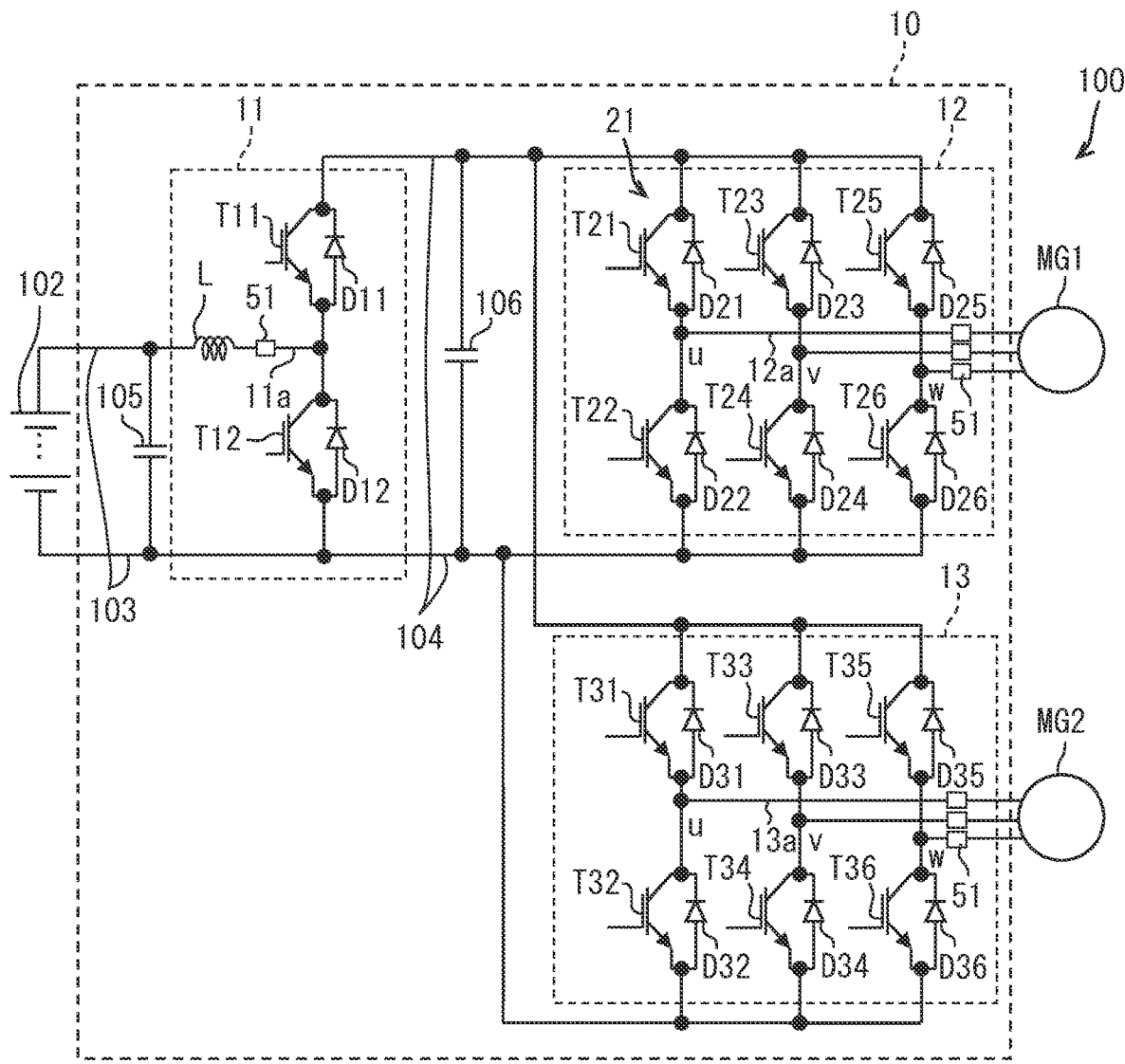
FIG. 1 is a diagram illustrating a configuration of a drive system according to a first embodiment.

To begin with, examples of relevant techniques will be described.

A current sensor according to a comparative example detects an electric current. The current sensor includes two magnetic sensors that detect magnetic flux generated by an electric current, and detects an electric current by detecting a difference between outputs of the two magnetic sensors. In the comparative example, for example, even when an external magnetic flux is generated by an electric current flowing through an adjacent wiring parallel to a wiring to be detected, the difference between the two magnetic sensors is not affected by the external magnetic flux because the two magnetic sensors are arranged in a direction intersecting the external magnetic flux.

In a configuration in which the two wirings are arranged parallel to each other, in order to prevent the electric current flowing through one of the wirings from being affected by the external magnetic flux from the other of the wirings when the electric current flowing through the one of the wirings is detected, the current sensor needs to include at least two magnetic sensors. In this case, a type of the current sensor is limited, and a degree of freedom of a current sensor is reduced. As described above, there is room for improvement in a current sensor from a viewpoint of improving current detection accuracy.

In contrast to the comparative example, according to a current sensor, and an electric power conversion device, current detection accuracy can be improved.

According to one aspect of the present disclosure, a current detection device detects an electric current. The current detection device includes a first conducting portion, a second conducting portion, and a current sensor. An electric current flows through the first conducting portion in a specific direction. The second conducting portion is provided at a position separated from the first conducting portion in the specific direction and through which an electric current flows in the specific direction. The current sensor detects an electric current flowing through the first conducting portion.

The current sensor is located at a position aligned with the first conducting portion in an orthogonal direction orthogonal to the specific direction and separated from the second conducting portion in the specific direction. The current sensor includes a sensor element which detects a magnetic flux generated by the electric current flowing through the first conducting portion and an element protector which protects the sensor element.

According to the current detection device, the sensor element is provided at a position aligned in the orthogonal direction with respect to the first conducting portion through which the electric current flows in the specific direction. Therefore, the magnetic flux generated by the electric current flowing through the first conducting portion can be detected by the sensor element. The sensor element is provided at a position separated in the specific direction from the second conducting portion through which an electric current flows in the specific direction. Therefore, the magnetic flux generated by the electric current flowing through the second conducting portion is less likely to interlink with the sensor element. As described above, in the current sensor in which the electric current flowing through the first conducting portion is a detection target, a deterioration of detection accuracy of the magnetic flux by the sensor element can be reduced due to the magnetic flux generated by the electric current flowing through the second conducting portion. That is, a decrease in the detection accuracy of the electric current by the current sensor can be reduced due to the electric current flowing through the second conducting portion. Therefore, the detection accuracy of the electric current by the current sensor can be increased.

According to one aspect of the present disclosure, a current sensor detects an electric current flowing through a first conducting portion through which an electric current flows in a specific direction. The current sensor dose not detect an electric current flowing through a second conducting portion provided at a position separated from the first conducting portion in the specific direction and through which an electric current flows in the specific direction.

The current sensor includes a sensor element located at a position aligned with the first conducting portion in an orthogonal direction orthogonal to the specific direction, and an element protector which protects the sensor element. The sensor element detects a magnetic flux generated by the electric current flowing through the first conducting portion.

According to the current sensor, the same effects as those of the current detection device can be obtained.

According to one aspect of the present disclosure, an electric power conversion device converts electric power supplied from a power supply to an electric load. The electric power conversion device includes a first conducting portion through which an electric current flows in a specific direction, a second conducting portion provided at a position separated from the first conducting portion in the specific direction, and a current sensor which detects an electric current flowing through the first conducting portion. An electric current flows through the second conducting portion in the specific direction.

The current sensor is located at a position aligned with the first conducting portion in an orthogonal direction orthogonal to the specific direction and separated from the second conducting portion in the specific direction. The current sensor includes a sensor element which detects a magnetic flux generated by the electric current flowing through the first conducting portion.

The electric power conversion device is capable of obtaining effects similar to effects of the current detection device.

Hereinafter, embodiments for implementing the present disclosure will be described referring to drawings. In each embodiment, the same reference numerals may be given to parts corresponding to matters described in a preceding embodiment, and overlapping explanations may be omitted. When only a part of a configuration is described in an embodiment, the other preceding embodiments can be applied to the other parts of the configuration. It may be possible not only to combine parts the combination of which is explicitly described in an embodiment, but also to combine parts of respective embodiments the combination of which is not explicitly described if any obstacle does not especially occur in combining the parts of the respective embodiments.

First Embodiment

A drive system 100 illustrated in FIG. 1 is mounted on a vehicle for example a hybrid vehicle. The drive system 100 includes a battery 102, motors MG1, MG2 and an electric power conversion device 10. The drive system 100 drives the motors MG1, MG2 to drive the drive wheels of the vehicle.

The battery 102 corresponds to a DC voltage supply including a rechargeable secondary battery, and corresponds to a power supply for supplying electric power to the motors MG1, MG2 through the electric power conversion device 10. The secondary battery is, for example, a lithium ion battery or a nickel hydrogen battery.

The electric power conversion device 10 converts DC power of the battery 102 into AC power suitable for driving the motors MG1, MG2. The electric power conversion device 10 converts AC power generated by the motors MG1, MG2 into DC power with which the battery 102 can be charged. The battery 102 and the motors MG1, MG2 are external devices when viewed from the electric power conversion device 10.

A motor MG1 functions as a drive source of the vehicle together with an engine (not shown). The motor MG1 mainly functions as an electric motor. The motor MG1 functions as a generator during deceleration or braking, for example. A motor MG2 mainly functions as a generator. The motor MG2 functions as an electric motor by being supplied with AC power when the engine is started, for example. In this manner, the electric power conversion device 10 is capable of performing a bidirectional power conversion. The motors MG1, MG2 correspond to electric loads.

The electric power conversion device 10 includes a boost converter 11 and inverters 12, 13. An input terminal of the boost converter 11 is connected to a low voltage system power line 103 on the battery 102, and an output terminal of the boost converter 11 is connected to a high voltage system power line 104 on the inverters 12, 13 side. The low voltage system power line 103 is a power line that electrically connects the battery 102 with the boost converter 11, and the high voltage system power line 104 is a power line that electrically connects the boost converter 11 with each inverters 12, 13.

A smoothing capacitor 105 is connected between a high potential and a low potential of the low voltage system power line 103. A smoothing capacitor 106 is connected between a high potential and a low potential of the high voltage system power line 104. A system main relay (not shown) is provided between a connection point of the low voltage system power line 103 with the capacitor 105 and the battery 102.

The boost converter 11 boosts an output voltage of the battery 102 to a voltage suitable for driving the motors. That is, the boost converter 11 boosts a power of the low voltage system power line 103 and supplies the boosted power to the high voltage system power line 104. In addition, the boost converter 11 steps down the DC power converted by the inverters 12, 13 to power that can be charged in the battery 102. That is, the boost converter 11 steps down the power of the high voltage system power line 104 and supplies the power to the low voltage system power line 103. The output voltage of the battery 102 is, for example, about 300 volts, and an output of the boost converter 11 is, for example, about 600 volts.

The boost converter 11 includes a reactor L, two switching elements T11, T12, and two diodes D11, D12. The switching elements T11, T12 are connected in series between the high potential and the low potential of the high voltage system power line 104 with a switching element T11 on the high potential. The switching elements T11, T12 are semiconductor elements such as integrated gate bipolar transistors (IGBTs), and power metal oxide semiconductor field effect transistors (MOSFETs). In the present embodiment, as the switching elements T11, T12, n-channel type IGBTs are employed. The switching elements T11, T12 correspond to power elements.

The diodes D11, D12 are connected in antiparallel to the corresponding switching elements T11, T12. Anodes of the diodes D11, D12 are connected to the emitter electrodes of the corresponding switching elements T11, T12.

One end of the reactor L is connected to the high potential of the low voltage system power line 103, that is, a positive electrode terminal of the capacitor 105. The other end of the reactor L is connected to a connection point between the switching elements T11, T12.

The inverters 12, 13 convert the input DC power into three-phase AC power having a predetermined frequency, and output the three-phase AC power to the corresponding motors MG1, MG2. The inverters 12, 13 convert electric power generated by the corresponding motors MG1, MG2 from AC electric power to DC electric power. The electric power generated by the motor MG2 is selectively used according to a traveling state of the hybrid vehicle and a state of charge (SOC) of the battery 102.

For example, during normal traveling, the electric power generated by the motor MG2 is directly used as electric power for driving the motor MG1. On the other hand, when the SOC of the battery 102 is lower than a predetermined value, the electric power generated by the motor MG2 is converted from AC to DC by the inverter 13, and then the voltage is adjusted by the boost converter 11 and charged in the battery 102. The electric power generated by the motor MG1 is converted from AC to DC by the inverter 12, and then the voltage is adjusted by the boost converter 11 and charged in the battery 102.

The inverter 12 is connected to the high voltage system power line 104. The inverter 12 includes six switching elements T21 to T26 and six diodes D21 to D26. The switching elements T21, T22 are connected in series between the high potential and the low potential of the high voltage system power line 104 with the switching element T21 on the high potential, and constitute a U-phase upper and lower arm. A connection point of the switching elements T21, T22 is electrically connected to a U-phase coil (not shown) of the motor MG1. The switching elements T23, T24 are connected in series between the high potential and the low potential of the high voltage system power line 104 with the switching element T23 on the high potential, and constitute a V-phase upper and lower arm. A connection point of the switching elements T23, T24 is electrically connected to a V-phase coil (not shown) of the motor MG1. The switching elements T25, T26 are connected in series between the high potential and the low potential of the high voltage system power line 104 with the switching element T25 on the high potential, and constitute a W-phase upper and lower arm. A connection point of the switching elements T25, T26 is electrically connected to a W-phase coil (not shown) of the motor MG1.

The switching elements T21 to T26 are semiconductor elements such as IGBTs, and power MOSFETs. In the present embodiment, as the switching elements T21 to T26, n-channel type IGBTs are employed. The diodes D21 to D26 are connected in antiparallel to the corresponding switching elements T21 to T26. Anodes of the diodes D21 to D26 are connected to the emitter electrodes of the corresponding switching elements T21 to T26. The switching elements T21 to T26 correspond to power elements.

The inverter 13 has the same configuration as the inverter 12. The inverter 13 includes six switching elements T31 to T36 and six diodes D31 to D36 connected in antiparallel to the corresponding switching elements T31 to T36. The switching elements T31, T32 are connected in series between the high potential and the low potential of the high voltage system power line 104 with the switching element T31 on the high potential, and a connection point is electrically connected to a U-phase coil (not shown) of the motor MG2. The switching elements T33, T34 are connected in series between the high potential and the low potential of the high voltage system power line 104 with the switching element T33 on the high potential, and a connection point is electrically connected to a V-phase coil (not shown) of the motor MG2. The switching elements T35, T36 are connected in series between the high potential and the low potential of the high voltage system power line 104 with the switching element T35 on the high potential, and a connection point are electrically connected to a W-phase coil (not shown) of the motor MG2.

The switching elements T31 to T36 are semiconductor elements such as IGBTs, and power MOSFETs. In the present embodiment, as the switching elements T31 to T36, n-channel type IGBTs are employed. The diodes D31 to D36 are connected in antiparallel to the corresponding switching elements T31 to T36. Anodes of the diodes D31 to D36 are connected to the emitter electrodes of the corresponding switching elements T31 to T36. The switching elements T31 to T36 correspond to power elements.

The electric power conversion device 10 includes current sensors 51. The current sensors 51 are provided in each of the boost converter 11 and the inverters 12, 13. The current sensors 51 detect an electric current flowing through each of the connection lines 11a, 12a, 13a. A connection line 11a electrically connects a connection point between the reactor L and the switching elements T11, T12. A connection line 12a is a connection line for connecting a connection point of the upper and lower arms of each phase of the inverter 12 to the coil of the corresponding phase of the motor MG1. The connection line 13a is a connection line for connecting a connection point of the upper and lower arms of each phase of the inverter 13 to the coil of the corresponding phase of the motor MG2.

Figure 2:
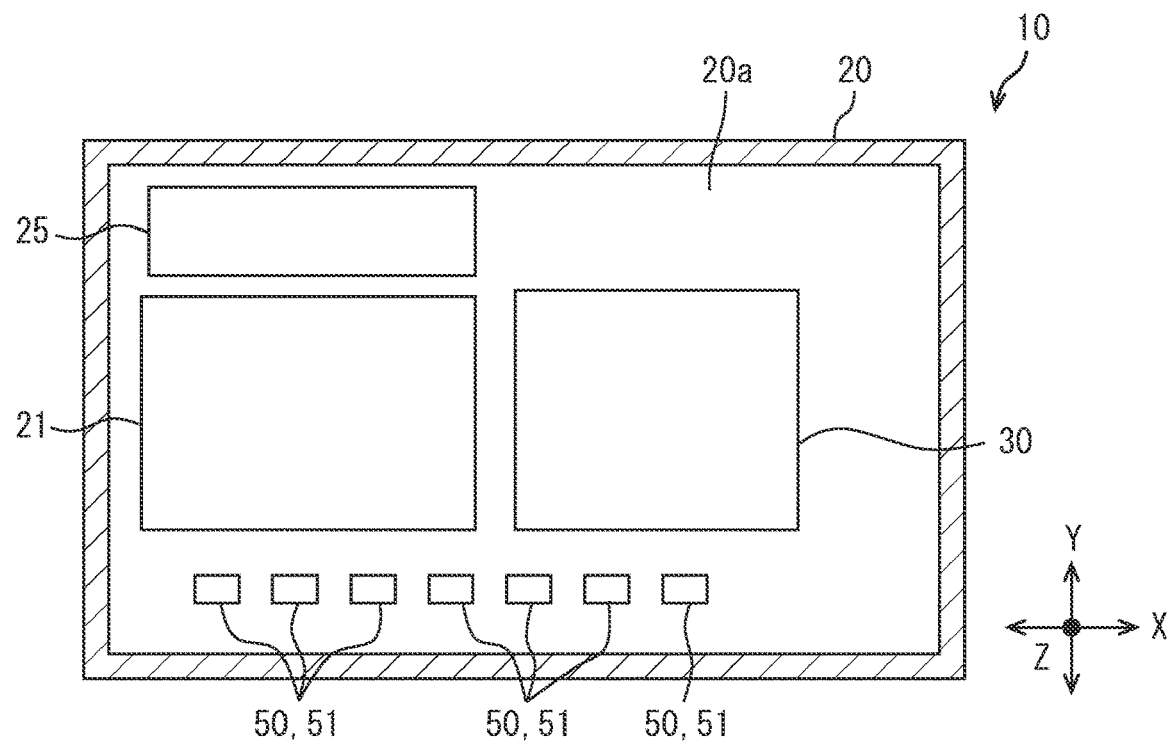
FIG. 2 is a plan view illustrating a schematic configuration of an electric power conversion device.

Next, a structure of the electric power conversion device 10 will be described. As shown in FIG. 2, the electric power conversion device 10 includes a case 20, a power unit 21, a capacitor unit 25, a reactor unit 30, and a sensor unit 50.

The power unit 21, the capacitor unit 25, the reactor unit 30, and the sensor unit 50 are housed in the case 20 and may be referred to as internal devices. An inner surface of the case 20 includes a case floor surface 20a. The units 21, 25, 30, 50 are arranged on the case floor surface 20a. In the electric power conversion device 10, directions orthogonal to each other are referred to as an X-direction, a Y-direction, and a Z-direction, and a direction orthogonal to the case floor surface 20a is referred to as the Z-direction. In the case 20, for example, the power unit 21 and the reactor unit 30 are arranged in the X-direction.

The power unit 21 constitutes the boost converter 11 and the inverters 12, 13 described above. The power unit 21 includes power cards 22 (see FIG. 3). Upper and lower arms are respectively formed on the power cards 22. Each of the power cards 22 includes a power element such as a switching element T11 for converting electric power, and corresponds to a power module. The power cards 22 are arranged at a predetermined pitch in the X-direction. The power unit 21 includes, for example, seven power cards 22. The boost converter 11 includes one power card 22. Each of the inverters 12, 13 includes three power cards 22. The power unit 21 may be referred to as a semiconductor module, and the power card 22 may be referred to as a semiconductor device.

The power unit 21 includes coolers (not shown) in addition to the power cards 22 described above. The coolers and the power cards 22 are alternately stacked in the X-direction to be configured the power unit 21.

The power card 22 constituting the boost converter 11 includes the switching elements T11, T12 and the diodes D11, D12. The power card 22 of a U-phase constituting the inverter 12 includes the switching elements T21, T22 and the diodes D21 and D22, and the power card 22 of V-phase includes the switching elements T23, T24 and the diodes D23, D24. The power card 22 of a W-phase constituting the inverter 12 includes the switching elements T25, T26 and the diodes D25, D26.

The power card 22 of a U-phase constituting the inverter 13 includes switching elements T31 and T32 and diodes D31 and D32, and the V-phase power card 22 includes switching elements T33 and T34 and diodes D33 and D34. The power card 22 of a W-phase constituting the inverter 12 includes the switching elements T35, T36 and the diodes D35, D36.

The capacitor unit 25 includes a capacitor element constituting the capacitor 105,106 and a unit main body protecting the capacitor element. The unit main body includes a capacitor case that houses the capacitor element. The reactor unit 30 includes a reactor element constituting the reactor L and a unit main body protecting the reactor element. The unit main body includes a reactor case that houses the reactor element.

Figure 3:
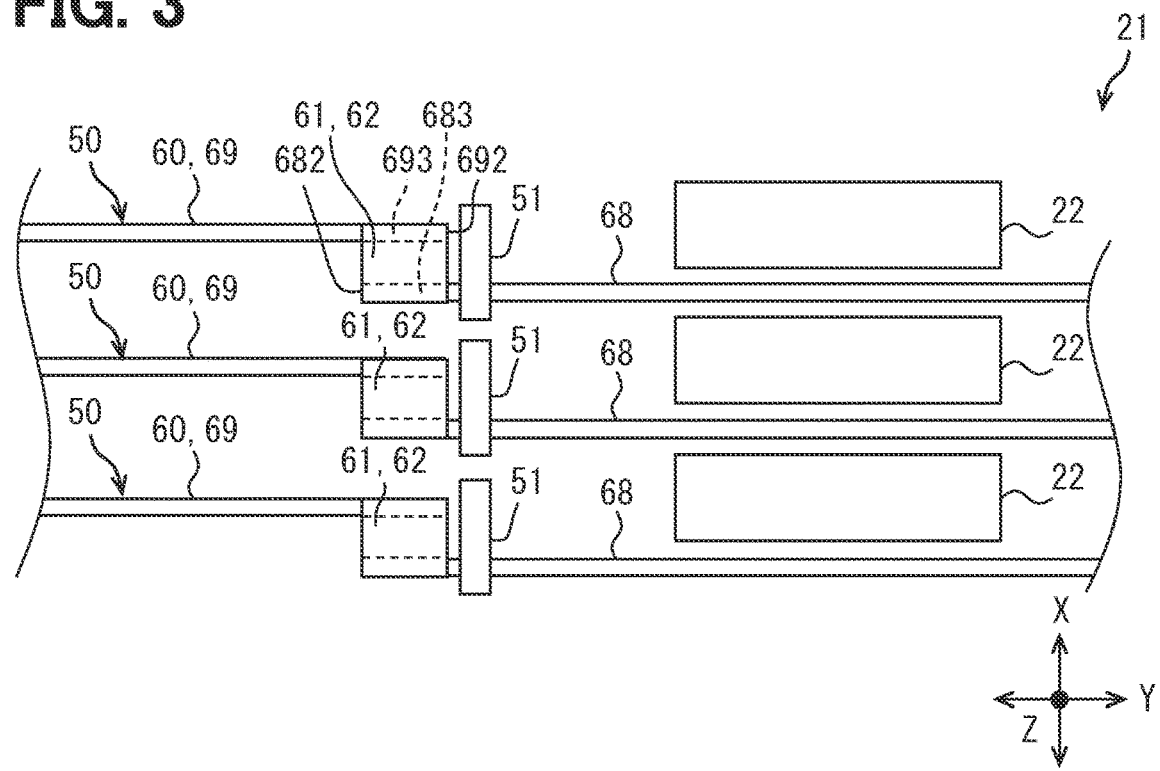
FIG. 3 is a diagram illustrating a configuration of a power unit and a sensor unit.

As shown in FIGS. 2, 3, sensor units 50 are provided in the case 20. The sensor units 50 are arranged in the X-direction, for example. The sensor unit 50 includes the current sensor 51 and a busbar 60. One sensor unit 50 includes one current sensor 51 and one busbar 60. The sensor unit 50 corresponds to a current detection device and may be referred to as a current sensor device. The sensor unit 50 is the current sensor 51 with the busbar 60, and is also the busbar 60 with the current sensor 51. In FIG. 2, the busbar 60 is not shown.

The busbar 60 is a conductive member having electrically conductive and made of a metal material or the like. The busbar 60 forms an energization path through which an electric current flows, and corresponds to an energization member. The busbar 60 has a plate shape as a whole and extends in a direction orthogonal to the Z-direction as a whole. The busbar 60 has a plate-like elongated member. The busbar is formed by punching or bending a metal plate made of copper or the like.

The busbar 60 is electrically connected to the power card 22. An electric current flows through the busbar 60 when the power card 22 is energized. The busbar is provided individually for each of the power cards 22. Each of busbars 60 includes a busbar 60 that forms each of the connection lines 11a, 12a, 13a. For example, seven busbars 60 are provided in the case 20. The busbars 60 forming the connection lines 11a, 12a, and 13a are one, three, and three in this order. The seven busbars 60 are arranged in the order corresponding to the U-phase, the V-phase, and the -W phase of the inverter 12, the U-phase, the V-phase, and the W-phase of the inverter 13, and the boost converter 11 from the power unit 21 toward the reactor unit 30 in the X-direction, for example.

In the boost converter 11, the busbar 60 electrically relays the reactor L and the connection point between the switching elements T11, T12. That is, the busbar 60 constitutes a part of the connection line 11a. In the inverter 12, for example, the U-phase busbar 60 electrically relays the U-phase coil of the motor MG1 and the connection point between the switching elements T21, T22. That is, the U-phase busbar 60 constitutes a part of the connection line 12a. In the inverter 13, for example, the U-phase busbar 60 electrically relays the U-phase coil of the motor MG2 and the connection point between the switching elements T31, T32. That is, the U-phase busbar 60 constitutes a part of the connection line 13a.

Figure 4:
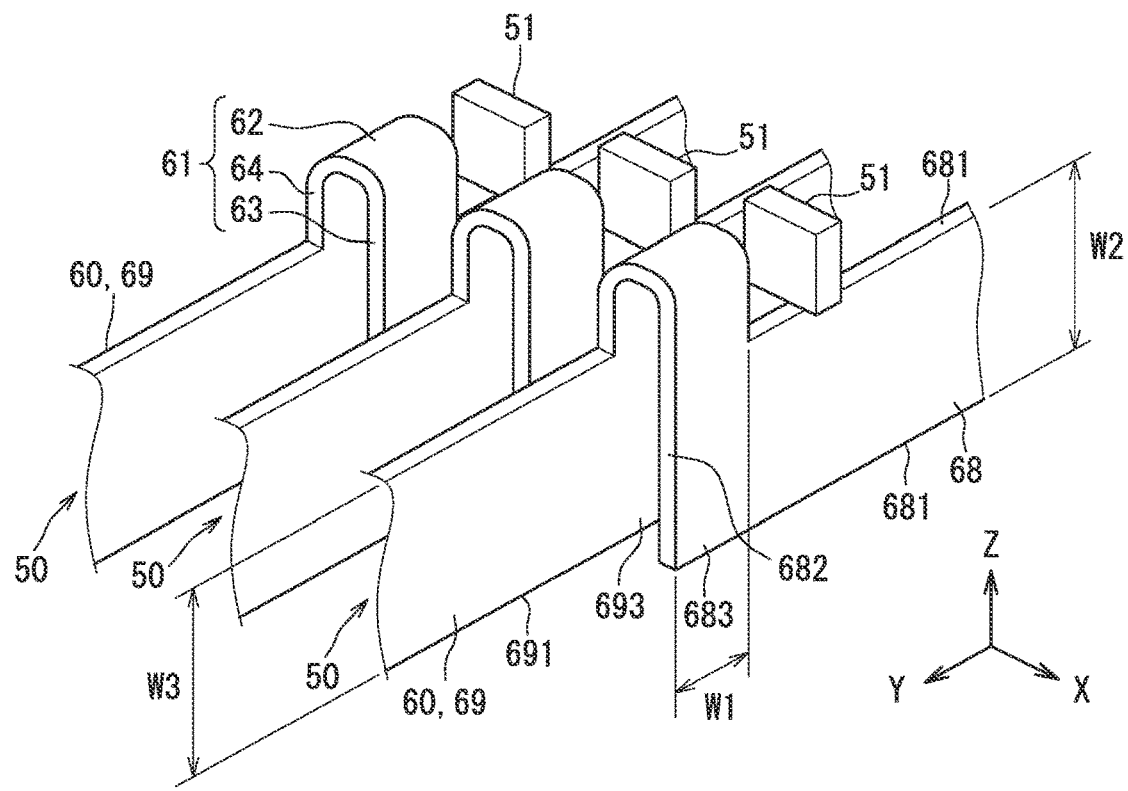
FIG. 4 is a perspective view illustrating a structure of the sensor unit.

As shown in FIGS. 3, 4, the busbar 60 includes a bent portion 61, a card-side base portion 68, and an opposite-side base portion 69. The bent portion 61 is provided between the card-side base portion 68 and the opposite-side base portion 69 in the energization path. The bent portion 61 connects the card-side base portion 68 with the opposite-side base portion 69. The bent portion 61, the card-side base portion 68, and the opposite-side base portion 69 are covered with a covering portion made of a resin material or the like. The covering portion has an insulating property and protects the bent portion 61, the card-side base portion 68, and the opposite-side base portion 69.

The card-side base portion 68 extends from the bent portion 61 toward the power card 22 and is electrically connected to the power card 22. The opposite-side base portion 69 extends from the bent portion 61 in a direction away from the power card 22, and is electrically connected to an internal device or an external device. For example, in the busbar 60 included in the boost converter 11, the opposite-side base portion 69 is electrically connected to the reactor L. In the busbar 60 included in the inverter 12, the opposite-side base portion 69 is electrically connected to the motor MG1 via a terminal portion. In the busbar 60 included in the inverter 13, the opposite-side base portion 69 is electrically connected to the motor MG2 via a terminal portion. The terminal portion is included in a terminal block installed in the case 20, and is connected to a conductive member such as the busbar 60.

The busbar 60 extends between the power unit 21 and the sensor unit 50. The busbar 60 is included in both the power unit 21 and the sensor unit 50. In the busbar 60, at least the card-side base portion 68 is included in the power unit 21, and at least the bent portion 61 is included in the sensor unit 50. In the present embodiment, all of the bent portion 61, the card-side base portion 68, and the opposite-side base portion 69 are included in the sensor unit 50.

Both the card-side base portion 68 and the opposite-side base portion 69 have a plate shape. The card-side base portion 68 and the opposite-side base portion 69 extend in the Y-direction with their plate surfaces extending in a direction orthogonal to the X-direction. In the card-side base portion 68 and the opposite-side base portion 69, the Y-direction is a longitudinal direction, the Z-direction is a width direction, and the X-direction is a thickness direction. The card-side base portion 68 and the opposite-side base portion 69 are provided at positions separated from each other in the X-direction. Portions of the card-side base portion 68 and the opposite-side base portion 69 overlap each other in the X-direction. Portions of the card-side base portion 68 and the opposite-side base portion 69 that overlap each other are referred to as overlapping portions 683,693. These overlapping portions 683,693 face each other. An overlapping portion 683 of the card-side base portion 68 and an overlapping portion 683 of the opposite-side base portion 69 are connected by the bent portion 61.

The card-side base portion 68 includes a base end portion 682 and a pair of base-side end portions 681. The pair of base-side end portions 681 are spaced apart from each other in the width direction and extend in the longitudinal direction in the card-side base portion 68. The base end portion 682 is an end portion facing the bent portion 61 in the card-side base portion 68, and extends in the width direction so as to extend over the pair of base-side end portions 681.

The opposite-side base portion 69 includes a base end portion 692 and a pair of base-side end portions 691. The pair of base-side end portions 691 are spaced apart from each other in the width direction at the opposite-side base portion 69 and extend in the longitudinal direction. The base end portion 692 is an end portion in the longitudinal direction of the opposite-side base portion 69, and extends in the width direction so as to extend over the pair of base-side end portions 691.

The card-side base portion 68 and the opposite-side base portion 69 are arranged in the X-direction in a state where the positions in the Z-direction are aligned with each other. In the card-side base portion 68 and the opposite-side base portion 69, the pair of base-side end portions 681,691 are arranged in the X-direction. The base end portions 682,692 are disposed at positions shifted from each other in the Y-direction so that the overlapping portion 683 is formed on the card-side base portion 68 and the overlapping portion 693 is formed on the opposite-side base portion 69.

The bent portion 61 connects the overlapping portion 683 of the card-side base portion 68 with the overlapping portion 693 of the opposite-side base portion 69. The bent portion 61 extends in the X-direction as a whole, and extends across the overlapping portions 683,693. The bent portion 61 extends across the base-side end portions 681,691 on one side in the Z-direction. The bent portion 61 is bent so as to expand toward one side in the Z-direction. The bent portion 61 may be bent or curved as long as it is bent so as to expand in the Z-direction.

The bent portion 61 includes a connecting portion 62, a card-side extending portion 63, and an opposite-side extending portion 64. The card-side extending portion 63 extends from the overlapping portion 683 of the card-side base portion 68 to one side in the Z-direction. The opposite-side extending portion 64 extends from the overlapping portion 693 of the opposite-side base portion 69 in the same direction as the card-side extending portion 63 in the Z-direction. The card-side extending portion 63 and the opposite-side extending portion 64 extend parallel to each other and face each other. The card-side extending portion 63 and the opposite-side extending portion 64 are arranged in the X-direction and correspond to a pair of extending portions.

The connecting portion 62 connects the card-side extending portion 63 with the opposite-side extending portion 64. The connecting portion 62 extends in the X-direction, and is in a state of being stretched between the card-side extending portion 63 and the opposite-side extending portion 64. The connecting portion 62 is provided on the opposite side of the card-side base portion 68 via the card-side extending portion 63. In addition, the connecting portion 62 is provided on an opposite side of the opposite-side base portion 69 via the opposite-side extending portion 64 in the Z-direction. In the bent portion 61, a connection part between the connecting portion 62 and the card-side extending portion 63 has a curved shape such that the connection part is chamfered. In addition, a connection part between the connecting portion 62 and the opposite-side extending portion 64 has a curved shape such that the connection part is chamfered.

The bent portion 61 has a plate shape as a whole. A plate surface of the bent portion 61 extends in the Y-direction. In the bent portion 61, both the connecting portion 62 and the extending portions 63, 64 have a plate shape. In the connecting portion 62, a plate surface of the connecting portion 62 extends in a direction orthogonal to the Z-direction as a whole. In the extending portions 63, 64, plate surfaces of the extending portions 63, 64 extend in a direction orthogonal to the X-direction as a whole.

The bent portion 61 has a smaller width than both the card-side base portion 68 and the opposite-side base portion 69. In the bent portion 61, a width dimension W1 in the Y-direction is smaller than each of a width dimension W2 in the Z-direction in the card-side base portion 68 and a width dimension W3 in the Z-direction in the opposite-side base portion 69. In the bent portion 61, all of the width dimension of the connecting portion 62, the width dimension of the card-side extending portion 63, and the width dimension of the opposite-side extending portion 64 in the Y-direction are the width dimension W1. The width dimension W2 of the card-side base portion 68 is the same as the width dimension W3 of the opposite-side base portion 69. For example, the width dimension W1 is approximately ½ of the width dimensions W2, W3.

The busbar 60 has a uniform thickness. For example, a thickness dimension of the card-side base portion 68, a thickness dimension of the opposite-side base portion 69, and a thickness dimension of the bent portion 61 are the same as each other. In the busbar 60, a cross-sectional area of the bent portion 61 is smaller than both a cross-sectional area of the card-side base portion 68 and a cross-sectional area of the opposite-side base portion 69. The cross-sectional area of the card-side base portion 68 is the same as the cross-sectional area of the opposite-side base portion 69. For example, the cross-sectional area of the connecting portion 62 is approximately ½ of the cross-sectional area of the base portions 68, 69. In the base portions 68, 69, an area of a cross section orthogonal to the Y-direction is the cross sectional area. In the extending portions 63, 64, an area of a cross section orthogonal to the Z-direction is a cross sectional area. In the connecting portion 62, an area of a cross section orthogonal to the X-direction is a cross sectional area.

The current sensor 51 is a current detection unit that detects an electric current flowing through the busbar 60. In the present embodiment, the current sensor 51 detects a magnetic flux generated by the electric current flowing through the connecting portion 62 with the electric current flowing through the connecting portion 62 as a detection target, and detects the electric current based on the magnetic flux. The current sensor 51 is a coreless type current sensor that does not have a magnetism collecting core for converging magnetic flux.

Figure 5:
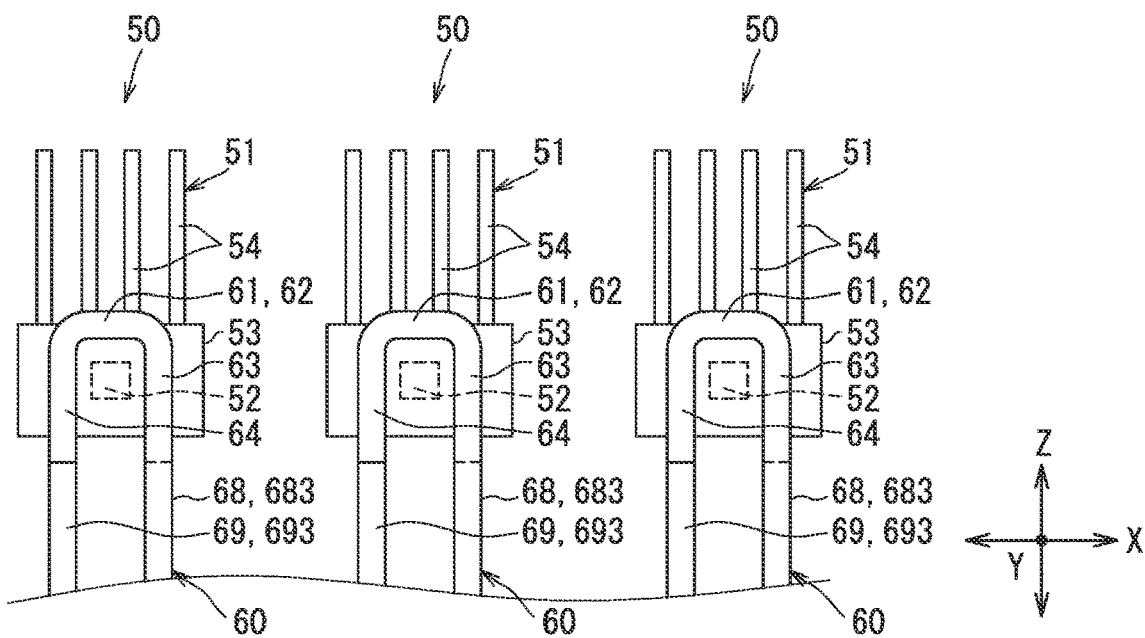
FIG. 5 is an enlarged view of surroundings of a current sensor in the sensor unit.

As shown in FIG. 5, the current sensor 51 includes a sensor element 52, a sensor main body 53, and a sensor terminal 54. The sensor element 52 is a magnetic sensor that detects a magnetic field. The sensor element 52 detects the magnetic flux of the magnetic field and outputs a detection signal corresponding to magnetic flux density. The sensor element 52 is an element that converts a magnetic signal into an electric signal, and may be referred to as a magnetoelectric conversion element. The sensor element 52 is, for example, a Hall element. The sensor element 52 has a predetermined detection direction and detects a magnetic flux passing through the sensor element 52 in the detection direction. For example, the detection signal of the sensor element 52 includes information on a component extending in the detection direction of the magnetic flux passing through the sensor element 52, but does not include information on a component orthogonal to the detection direction. That is, the sensor element 52 detects a component extending in the detection direction of the magnetic flux passed through the sensor element 52, but does not detect a component orthogonal to the detection direction. One current sensor 51 has one sensor element 52.

The sensor main body 53 has a plate shape as a whole made of a resin material or the like, and accommodates the sensor element 52 in a state of being covered. The sensor main body 53 protects the sensor element 52 in a state in which the sensor element 52 is capable of detecting the magnetic flux, and corresponds to an element protector. The sensor main body 53 is fixed to the busbar 60 by being joined to the covering portion with an adhesive or the like. The sensor terminal 54 has an elongated shape made of a metal material or the like, and is electrically connected to the sensor element 52. One end of the sensor terminal 54 is embedded in the sensor main body 53, and the other end protrudes from the sensor main body 53.

The current sensor 51 includes a sensor substrate (not shown). The sensor substrate is provided on a detection circuit that detects an electric current flowing through the busbar 60. The detection circuit is electrically connected to both the sensor element 52 and the sensor terminal 54. The detection circuit calculates the electric current using the detection signal input from the sensor element 52, and outputs the calculation result from the sensor terminal 54 as the detection signal of the current sensor 51. The current sensor 51 outputs the detection signal to the controller. The controller is included in the electric power conversion device 10 and controls the boost converter 11 and the inverters 12,13. For example, the controller controls driving of the switching elements T11, T12, T21 to T26, T31 to T36.

As shown in FIGS. 3 to 5, the current sensor 51 is provided at a position aligned with the bent portion 61 in the Y-direction. The current sensor 51 is located at a position spaced apart from the card-side base portion 68 in the Y-direction, for example. The current sensor 51 is located closer to the card-side base portion 68 than the bent portion 61 in the Y-direction.

The sensor element 52 is provided at a position where a magnetic flux passing through an inside of the bent portion 61 in the Y-direction is detected. The sensor element 52 is provided at a position aligned with the bent portion 61 in the Y-direction. The sensor element 52 is located at a position separated toward the card-side base portion 68 in the Y-direction, for example. The sensor element 52 is provided inside the bent portion 61 in a direction orthogonal to the Y-direction. For example, the sensor element 52 is at a position separated from the connecting portion 62 in the Z-direction and at a position separated from both of the extending portions 63, 64 in the X-direction.

The sensor element 52 is located at a position close to the bent portion 61 in the Y-direction. For example, in the Y-direction, a separation distance between the sensor element 52 and the bent portion 61 is smaller than the width dimension W1 of the bent portion 61. The sensor element 52 is provided between the card-side extending portion 63 and the opposite-side extending portion 64 in the X-direction. For example, in the X-direction, the sensor element 52 is at a middle position between the card-side extending portion 63 and the opposite-side extending portion 64. The sensor element 52 is provided closer to the extending portions 63, 64 than the connecting portion 62 in the Z-direction. For example, in the Z-direction, the sensor element 52 is located closer to the connecting portion 62 than the base portions 68, 69. Regarding the sensor element 52, the X-direction corresponds to a specific direction, the Y-direction corresponds to an orthogonal direction, and the Z-direction corresponds to an extending direction.

The sensor main body 53 has a plate shape, and a plate surface of the sensor main body 53 extends in a direction orthogonal to the Y-direction. The sensor main body 53 is in a state of extending across the card-side extending portion 63 and the opposite-side extending portion 64 in the X-direction. The sensor element 52 is located at a center of the sensor main body 53. The sensor terminal 54 extends from the sensor main body 53 in a direction away form the base portions 68,69 in the Z-direction.

In the current sensor 51, the detection direction of the sensor element 52 is set to the Y-direction. In the sensor unit 50, a direction of the electric current flowing through each of the card-side base portion 68 and the opposite-side base portion 69 is the Y-direction. Therefore, the detection direction of the sensor element 52 is the same as a direction of the electric current flowing through the base portions 68, 69. A deviation of the detection direction of the sensor element 52 with respect to the direction of the electric current flowing through the base portions 68, 69 is referred to as a deviation angle. The deviation angle is substantially zero.

When the electric current flows through the busbar 60, a magnetic flux generated by the electric current flowing through the base portions 68, 69 extends in a direction orthogonal to the Y-direction. The magnetic flux does not include a component extending in the Y-direction or is very small. On the other hand, the magnetic flux generated by the electric current flowing through the bent portion 61 extends in the Y-direction. Therefore, the sensor element 52 detects a magnetic flux generated by energization of the bent portion 61 of the busbar 60.

As shown in FIGS. 2 and 3, the sensor units 50 are arranged in the X-direction. For example, the busbars 60 are arranged such that the respective bent portions 61 are aligned in the X-direction along an inner wall surface of the case 20. These bent portions 61 are arranged along a virtual straight line extending in the X-direction, and are aligned in a direction orthogonal to the X-direction. The current sensors 51 are arranged such that the sensor elements 52 are arranged in the X-direction along the inner wall surface of the case 20. The current sensors 51 and the sensor elements 52 are arranged along a virtual straight line extending in the X-direction, and are aligned in a direction orthogonal to the X-direction. The current sensors 51 and the sensor elements 52 are linearly arranged so as to be linearly arranged in the X-direction.

In the power unit 21, in addition to the power cards 22, card-side base portions 68 are stacked in the X-direction. The power card 22 and the card-side base portion 68 are alternately arranged in the X-direction with their plate surfaces facing each other. The bent portion 61 is located at a position aligned with the power card 22 in the Y-direction. A separation distance between two card-side base portions 68 adjacent to each other via the power card 22 is set to a value corresponding to a thickness dimension of the power card 22. Further, in the X-direction, a length dimension of the bent portion 61 is smaller than the separation distance between the two card-side base portions 68 adjacent to each other via the power card 22. As described above, the two adjacent busbars 60 are provided with the bent portions 61 by effectively utilizing the separation distance secured by the power card 22.

Figure 7:
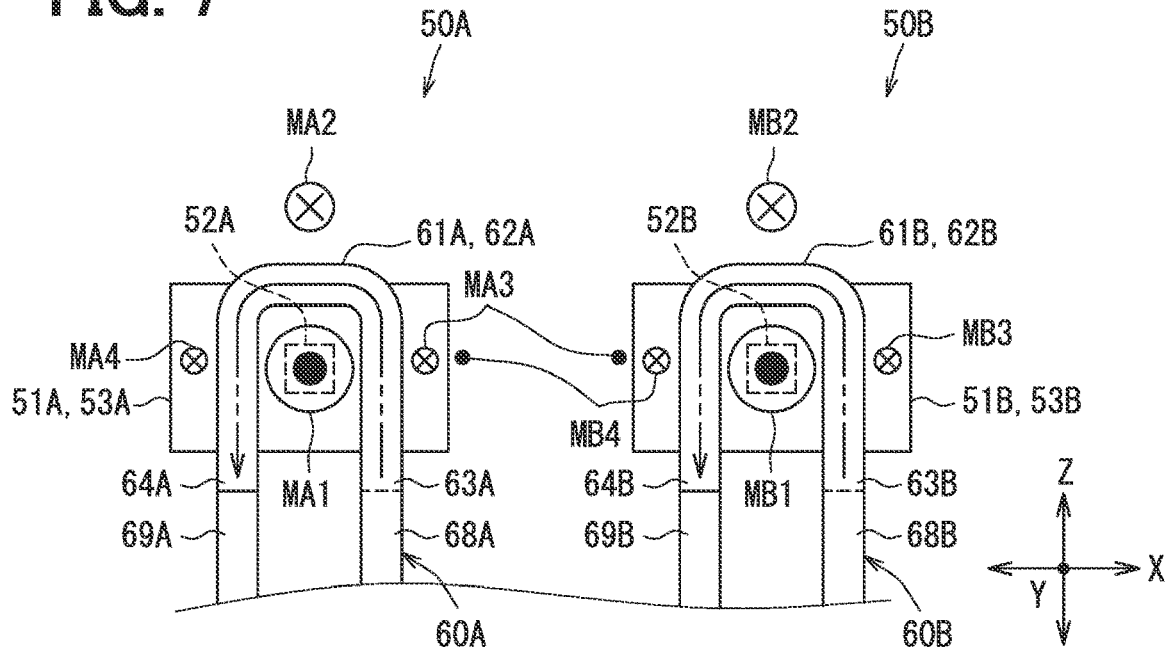
FIG. 7 is a diagram for explaining a magnetic flux generated by an electric current flowing through two adjacent bent portions.

As shown in FIG. 7, the sensor units 50 include a first sensor unit 50A and a second sensor unit 50B. The sensor units 50A, 50B are two sensor units 50 adjacent to each other in the X-direction. The first sensor unit 50A corresponds to a current detection device.

The busbar 60 included in the first sensor unit 50A is referred to as a first busbar 60A. The first busbar 60A is referred to as a first bent portion 61A, a first card-side base portion 68A, a first opposite-side base portion 69A, a first connecting portion 62A, a first card-side extending portion 63A, and a first opposite-side extending portion 64A. The first busbar 60A corresponds to a first conductive member. In the first busbar 60A, the first bent portion 61A corresponds to a bent portion, and the first card-side base portion 68A and the first opposite-side base portion 69A correspond to a pair of first base portions. The first card-side base portion 68A corresponds to one of the pair of first base portions, and the first opposite-side base portion 69A corresponds to the other of the pair of first base portions. In the first bent portion 61A, the first card-side extending portion 63A and the first opposite-side extending portion 64A correspond to a pair of extending portions, and the first connecting portion 62A corresponds to a first conducting portion.

The current sensor 51 included in the first sensor unit 50A is referred to as a first current sensor 51A. In the first current sensor 51A, the sensor element 52 is referred to as a first sensor element 52A, and the sensor main body 53 is referred to as a first sensor main body 53A. The first current sensor 51A corresponds to a current sensor, the first sensor element 52A corresponds to a sensor element, and the first sensor main body 53A corresponds to an element protector. In FIG. 7, the sensor terminal 54 is not shown.

The busbar 60 included in the second sensor unit 50B is referred to as a second busbar 60B. The second busbar 60B is referred to as a second bent portion 61B, a second card-side base portion 68B, a second opposite-side base portion 69B, a second connecting portion 62B, a second card-side extending portion 63B, and a second opposite-side extending portion 64B. The second busbar 60B corresponds to a second conductive member. In the second busbar 60B, the second connecting portion 62B corresponds to a second conducting portion, and the second card-side base portion 68B and the second opposite-side base portion 69B correspond to a pair of second base portions. The second card-side base portion 68B corresponds to one of the pair of second base portions, and the second opposite-side base portion 69B corresponds to the other of the pair of second base portions.

The current sensor 51 included in the second sensor unit 50 is referred to as a second current sensor 51B. In the second current sensor 51B, the sensor element 52 is referred to as a second sensor element 52B, and the sensor main body 53 is referred to as a second sensor main body 53B.

In the first sensor unit 50A, an electric current flows through the first connecting portion 62A in the X-direction. The first sensor element 52A is located at a position separated in the Y-direction from the first bent portion 61A including the first connecting portion 62A. The first connecting portion 62A is located at a position separated from the second connecting portion 62B in the X-direction. The first sensor element 52A is separated from the second connecting portion 62B in both the X-direction and the Y-direction.

Figure 6:
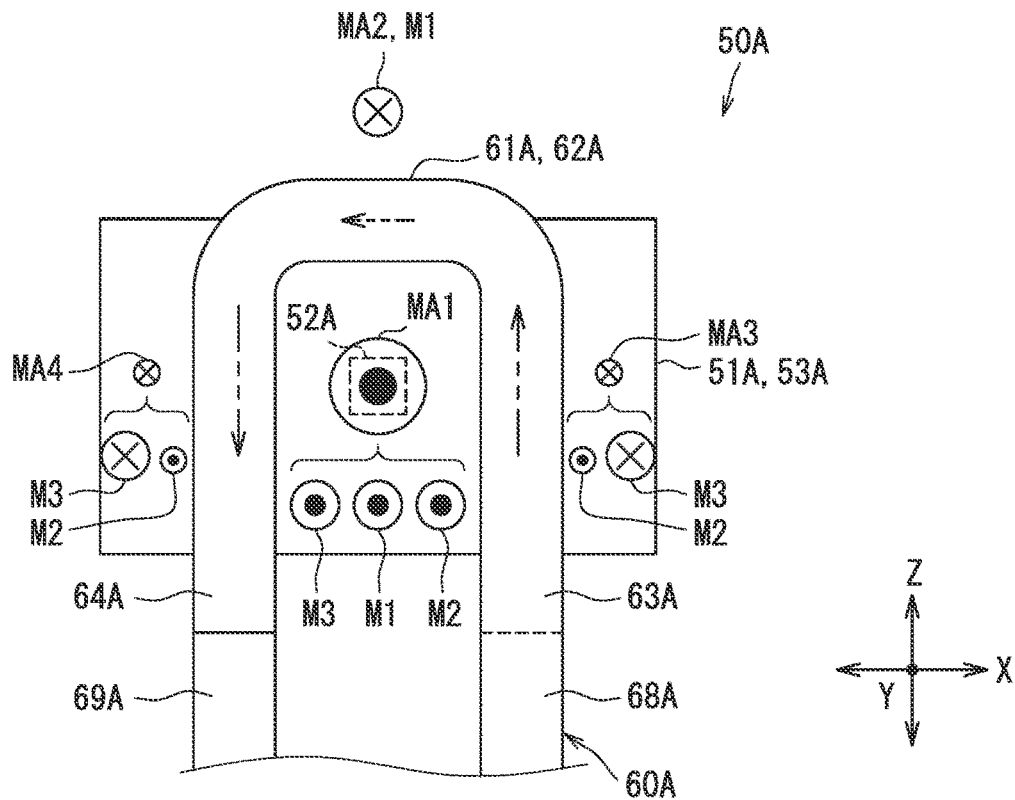
FIG. 6 is a diagram for explaining a magnetic flux generated by an electric current flowing through a bent portion.

Next, it is assumed that, in each of the first busbar 60A and the second busbar 60B, an electric current flows from the card-side base portions 68A, 68B toward the opposite-side base portions 69A, 69B. In this case, as shown in FIG. 6, in the first busbar 60A, a connection magnetic flux M1, a card-side magnetic flux M2, and an opposite-side magnetic flux M3 are generated by the electric current flowing through the first bent portion 61A. The connection magnetic flux M1 is a magnetic flux generated by an electric current flowing through the first connecting portion 62. The card-side magnetic flux M2 is a magnetic flux generated by an electric current flowing through the first card-side extending portion 63A. The opposite-side magnetic flux M3 is a magnetic flux generated by an electric current flowing through the first opposite-side extending portion 64A.

Magnetic fluxes corresponding to the connection magnetic flux M1, the card-side magnetic flux M2, and the opposite-side magnetic flux M3 are generated around the first bent portion 61A. For example, inside the first bent portion 61A, the connection magnetic flux M1, the card-side magnetic flux M2, and the opposite-side magnetic flux M3 extend in the same direction in the Y-direction. The magnetic flux passing through the inside of the first bent portion 61A is referred to as a first internal magnetic flux MA1. The first internal magnetic flux MA1 is a magnetic flux obtained by adding the connection magnetic flux M1, the card-side magnetic flux M2, and the opposite-side magnetic flux M3.

On the other hand, outside the first bent portion 61A, positions and directions of the connection magnetic flux M1, the card-side magnetic flux M2, and the opposite-side magnetic flux M3 are different from each other. For example, while the connection magnetic flux M1 is present outside the first connecting portion 62A in the Z-direction, the card-side magnetic flux M2 and the opposite-side magnetic flux M3 are not present. A magnetic flux passing through outside the first connecting portion 62A in the Z-direction is referred to as a first upper magnetic flux MA2. The first upper magnetic flux MA2 is the same as the connection magnetic flux M1.

Outside the first card-side extending portion 63A in the X-direction, the card-side magnetic flux M2 and the opposite-side magnetic flux M3 exist in opposite directions to each other, while the connection magnetic flux M1 does not exist. Outside the first card-side extending portion 63A, the card-side magnetic flux M2 is larger than the opposite-side magnetic flux M3 since the first card-side extending portion 63A is located closer to the first opposite-side extending portion 64. The magnetic flux passing through the outside of the first card-side extending portion 63 in the X-direction is referred to as a first right magnetic flux MA3. The first right magnetic flux MA3 is a magnetic flux remaining without being canceled by the opposite-side magnetic flux M3 of the card-side magnetic flux M2.

Outside the first opposite-side extending portion 64A in the X-direction, the card-side magnetic flux M2 and the opposite-side magnetic flux M3 exist in opposite directions to each other, while the connection magnetic flux M1 does not exist. Outside of the first card-side extending portion 63A, the opposite-side magnetic flux M3 is larger than the card-side magnetic flux M2 since the first opposite-side extending portion 64A is located closer to the first card-side extending portion 63A. The magnetic flux passing through the outside of the first opposite-side extending portion 64 in the X-direction is referred to as a first left magnetic flux MA4. The first left magnetic flux MA4 is a magnetic flux remaining in the opposite-side magnetic flux M3 without being canceled by the card-side magnetic flux M2.

Similarly to the electric current flowing through the first bent portion 61, the electric current flowing through the second bent portion 61B generates the connection magnetic flux M1, the card-side magnetic flux M2, and the opposite-side magnetic flux M3. As shown in FIG. 7, a second internal magnetic flux MB1, a second upper magnetic flux MB2, a second right magnetic flux MB3, and a second left magnetic flux MB4 are generated in the second busbar 60B by the connection magnetic flux M1, the card-side magnetic flux M2, and the opposite-side magnetic flux M3. The second internal magnetic flux MB1 is a magnetic flux passing through the inside of the second bent portion 61B. The second upper magnetic flux MB2 is a magnetic flux passing through an upper part of the second connecting portion 62B in the Z-direction. The second right magnetic flux MB3 is a magnetic flux passing through an outside of the second card-side extending portion 63B in the X-direction. The second left magnetic flux MB4 is a magnetic flux passing through an outside of the second opposite-side extending portion 64B in the X-direction.

In FIG. 7, the second bent portion 61B is arranged rightward the first bent portion 61. In this configuration, it is considered that the second left magnetic flux MB4 generated by the electric current flowing through the second bent portion 61B passes through the first bent portion 61. However, the second left magnetic flux MB4 decreases at a position farther from the second bent portion 61B. For example, the second left magnetic flux MB4 is sufficiently smaller than the first internal magnetic flux MA1 inside the first bent portion 61. Therefore, in the first sensor unit 50A, the first sensor element 52A is less likely to detect the second left magnetic flux MB 4.

As described above, in the first sensor unit 50, the first internal magnetic flux MA1 includes the connection magnetic flux M1 generated by the electric current flowing through the first connecting portion 62A. Therefore, the first sensor element 52A detects the connection magnetic flux M1 by detecting the first internal magnetic flux MA1. In the second sensor unit 50, the second left magnetic flux MB4 is less likely to include the connection magnetic flux M1 generated by the electric current flowing through the second connecting portion 62B. Therefore, regardless of whether the second left magnetic flux MB 4 reaches the inside of the first bent portion 61, the connection magnetic flux M1 generated by the electric current flowing through the second connecting portion 62B is difficult to reach the inside of the first bent portion 61. Therefore, the connection magnetic flux M1 generated by the electric current flowing through the second connecting portion 62B from being detected by the first sensor element 52A can be prevented.

According to the present embodiment, the first sensor element 52A is provided at a position aligned in the Y-direction with respect to the first connecting portion 62A through which the electric current flows in the X-direction. Therefore, the connection magnetic flux M1 generated by the electric current flowing through the first connecting portion 62A can be detected by the first sensor element 52. On the other hand, the first sensor element 52A is provided at a position separated in the X-direction from the second connecting portion 62B through which the electric current flows in the X-direction. Therefore, the connection magnetic flux M1 generated by the electric current flowing through the second connecting portion 62B is less likely to interlink with the first sensor element 52A. In this way, with respect to the first current sensor 51A whose detection target is the electric current flowing through the first connecting portion 62A, the deterioration of the detection accuracy of the connection magnetic flux M1 by the first sensor element 52A can be reduced due to the connection magnetic flux M1 generated by the electric current flowing through the second connecting portion 62B. That is, a decrease in the detection accuracy of the electric current by the first current sensor 51 can be reduced due to the electric current flowing through the second connecting portion 62B. Therefore, the detection accuracy of the electric current by the first current sensor 51 can be increased.

According to the present embodiment, the first sensor element 52A is provided at a position separated from the second connecting portion 62B in the Y-direction in addition to the X-direction. In this configuration, for example, the first sensor element 52A can be located at a position farther from the second connecting portion 62B than in a configuration in which the first sensor element 52A is located at a position aligned with the second connecting portion 62B in the Y-direction. Therefore, the connection magnetic flux M1 generated by the electric current flowing through the second connecting portion 62B from being interlinked with the first sensor element 52 can be further reduced.

According to the present embodiment, the first sensor element 52A is provided at a position closer to the extending portions 63, 64 than the first connecting portion 62A in the Z-direction and between the extending portions 63, 64 in the X-direction. That is, the first sensor element 52A is located within a height range of the first bent portion 61A in the Z-direction. In this configuration, the first internal magnetic flux MA1 detected by the first sensor element 52A is capable of including all of the connection magnetic flux M1, the card-side magnetic flux M2, and the opposite-side magnetic flux M3 generated by the electric current flowing through the first bent portion 61. As described above, by increasing the first internal magnetic flux MA1 to be detected by the first sensor element 52, the detection accuracy of the first internal magnetic flux MA1 detected by the first sensor element 52A can be improved. In addition, since the first internal magnetic flux MA1 is sufficiently large, even if an external magnetic flux such as the second left magnetic flux MB4 enters the inside of the first bent portion 61A as noise, an error rate caused by the noise can be reduced.

According to the present embodiment, in the configuration in which the base portions 68A, 69A of the first busbar 60A and the base portions 68B, 69B of the second busbar 60B both extend in the Y-direction, the detection direction of the first sensor element 52A is the Y-direction. This configuration prevents the first sensor element 52A from detecting the magnetic flux generated by the electric current flowing through the base portions 68A, 69A, 68B, 69B. Therefore, a decrease in the accuracy with which the first sensor element 52A detects the connection magnetic flux M1 can be reduced due to the magnetic flux generated by the electric current flowing through the base portions 68A, 69A, 68B, 69B.

According to the present embodiment, in the first busbar 60A and the second busbar 60B, the card-side base portions 68A, 68B are provided at positions that extend toward the same direction in the Y-direction and are shifted to the same direction in the X-direction with respect to the opposite-side base portions 69A, 69B. That is, in the first busbar 60A and the second busbar 60B, directions in which the bent portions 61A, 61B are bent with respect to the card-side base portions 68A, 68B are the same. In the configuration in which the first busbar 60A and the second busbar 60B are adjacent to each other, a gap between the card-side base portions 68A, 68B and a gap between the opposite-side base portions 69A, 69B can be secured in the same manner. Therefore, these gaps can be effectively utilized as an installation space of the power card 22 or the like in a limited space inside the case 20.

According to the present embodiment, in the first busbar 60A, a cross-sectional area of the first connecting portion 62A is smaller than both a cross-sectional area of the first card-side base portion 68A and a cross-sectional area of the first opposite-side base portion 69A. In this configuration, an electric current density of the electric current flowing through the first connecting portion 62A is likely to be higher than an electric current density of the electric current flowing through the base portions 68A, 69A. In this case, since a magnetic flux density of the connection magnetic flux M1 generated by the electric current flowing through the first connecting portion 62A is likely to increase, the detection accuracy of the connection magnetic flux M1 by the first sensor element 52A can be improved.

In addition, since the width dimension W1 of the first connecting portion 62A is smaller than the width dimensions W2, W3 of the base portions 68A, 69A, a cross-sectional area of the first connecting portion 62A is smaller than a cross-sectional areas of the base portions 68A, 69A. Therefore, there is not necessary to have different thickness dimensions for each of the first connecting portion 62A and the base portions 68A, 69A in one first busbar 60A. Therefore, instead of using a dedicated member for manufacturing the first busbar 60A, a plate material having high versatility can be used.

According to the present embodiment, the first card-side base portion 68A is provided at a position aligned with the power card 22 in the X-direction, and the first connecting portion 62A is provided at a position aligned with the power card 22 in the Y-direction. In this configuration, a space adjacent to the first card-side base portion 68A in the X-direction can be secured by the power card 22. The space secured by the power card 22 can be used as a space for installing the first connecting portion 62. Therefore, instead of securing a dedicated space for installing the first connecting portion 62, a space that may be a dead space can be effectively used as an installation space for the first connecting portion 62A.

Second Embodiment

In a second embodiment, a current sensor 51 is a differential current detection unit. Configurations, operations, and effects not specifically described in the second embodiment are the same as those in the above-described first embodiment. In the second embodiment, differences from the above-described first embodiment will be mainly described.

Figure 8:
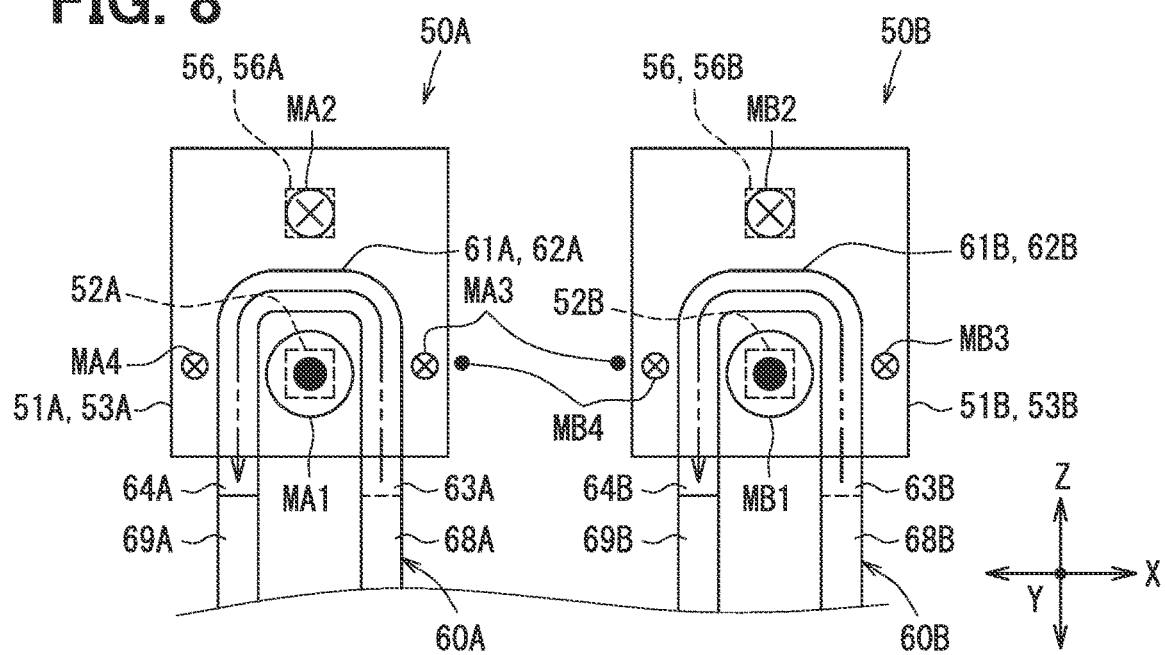
FIG. 8 is a diagram for explaining a magnetic flux generated by an electric current flowing through two adjacent bent portions in a second embodiment.

As shown in FIG. 8, the current sensor 51 includes a sensor element 56 in addition to a sensor element 52. The sensor element 52 is referred to as an inner sensor element 52, and the sensor element 56 is referred to as an outer sensor element 56. The outer sensor element 56 has the same configuration as the inner sensor element 52. For example, the outer sensor element 56 is a magnetic sensor that detects a magnetic field and has a predetermined detection direction. In the current sensor 51, the detection direction of the inner sensor element 52 is the same as the detection direction of the outer sensor element 56. For example, the detection directions of the sensor elements 52, 56 are the Y-direction.

The outer sensor element 56 is provided at a position aligned with the inner sensor element 52 in a direction orthogonal to the Y-direction. The outer sensor element 56 is located at a position aligned with the inner sensor element 52 in the Z-direction, for example. In the direction orthogonal to the Y-direction, the inner sensor element 52 is provided inside the bent portion 61, whereas the outer sensor element 56 is provided outside the bent portion 61. The outer sensor element 56 is provided on the side opposite to the inner sensor element 52 via the connecting portion 62 in the Z-direction, for example. The outer sensor element 56 is located at a position separated from the connecting portion 62 in the Z-direction. The outer sensor element 56 is provided between the extending portions 63, 64 in the X-direction, and is located at a position separated from both of the extending portions 63, 64.

Similarly to the inner sensor element 52, the outer sensor element 56 is provided at a position aligned with the bent portion 61 in the Y-direction. The outer sensor element 56 is located at a position separated from the bent portion 61 toward the card-side base portion 68 in the Y-direction, for example.

The current sensor 51 calculates a difference between a detection result of the inner sensor element 52 and a detection result of the outer sensor element 56, and calculates an electric current using the difference. In the current sensor 51, a detection circuit is electrically connected to the outer sensor element 56 in addition to the inner sensor element 52. The detection circuit calculates a magnetic flux density for each of the detection signals of the inner sensor element 52 and the outer sensor element 56, and calculates a difference between the magnetic flux densities. The detection circuit calculates the electric current using the difference between the magnetic flux densities.

In the present embodiment, as shown in FIG. 8, the first current sensor 51A includes a first outer sensor element 56A, and the second current sensor 51B includes a second outer sensor element 56B. The first sensor element 52A included in the first current sensor 51A and the second sensor element 52B included in the second current sensor 51B are both inner sensor elements 52. In the first sensor unit 50, the first outer sensor element 56A detects a first upper magnetic flux MA2. The first current sensor 51A calculates a difference between the first internal magnetic flux MA1 detected by the first sensor element 52A and the first upper magnetic flux MA2 detected by the first outer sensor element 56A. The first current sensor 51A calculates the electric current flowing through the first connecting portion 62A using the difference. The first sensor element 52A corresponds to an inner sensor element, and the first outer sensor element 56A corresponds to an outer sensor element.

According to the present embodiment, the first current sensor 51A includes the first outer sensor element 56A in addition to the first sensor element 52A, and the first outer sensor element 56A is provided outside the first bent portion 61A in a direction orthogonal to the Y-direction. In this configuration, the first upper magnetic flux MA2 detected by the first outer sensor element 56A includes the connection magnetic flux M1, but does not include the card-side magnetic flux M2 and the opposite-side magnetic flux M3. On the other hand, the first internal magnetic flux MA1 detected by the first sensor element 52A includes all of the connection magnetic flux M1, the card-side magnetic flux M2, and the opposite-side magnetic flux M3. Therefore, the difference between the first upper magnetic flux MA2 detected by the first outer sensor element 56A and the first internal magnetic flux MA1 detected by the first sensor element 52A is likely to be large. Therefore, by using the current sensor 51 as a difference type current detection unit, the detection accuracy of the electric current can be improved.

First Modification

Figure 9:
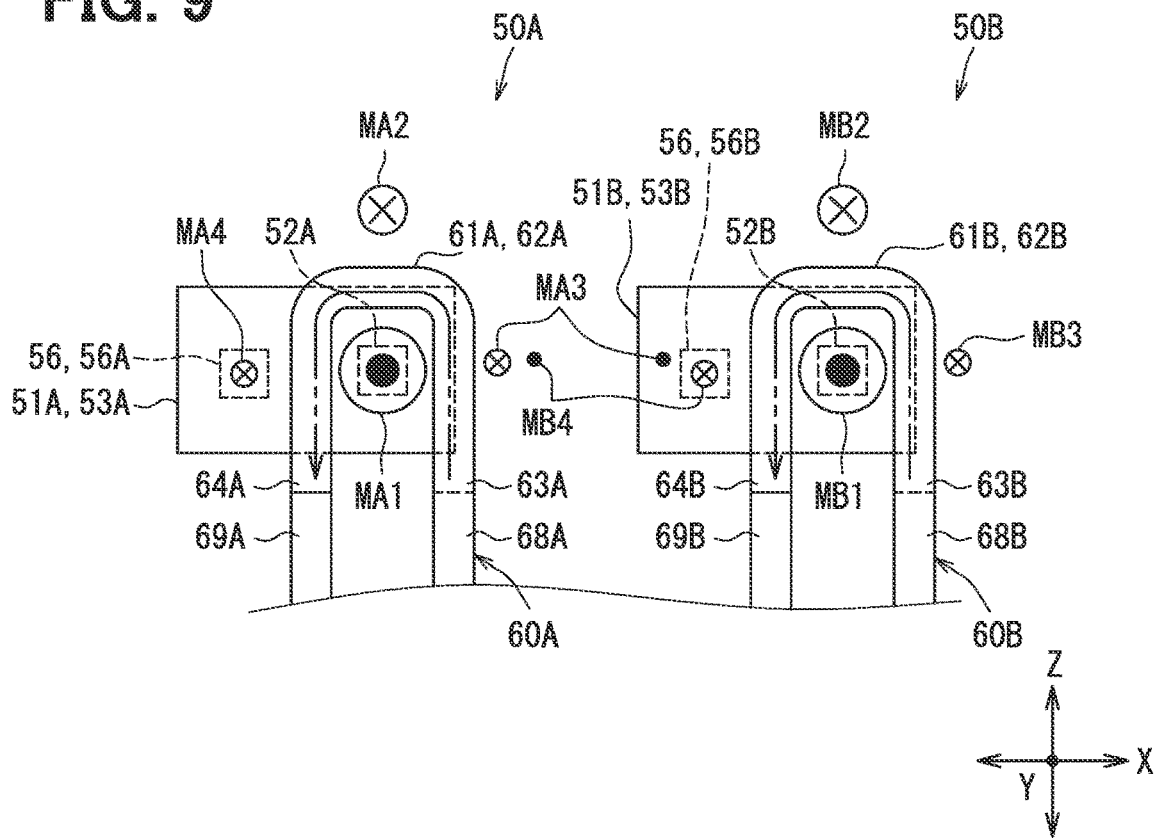
FIG. 9 is a diagram for explaining a magnetic flux generated by an electric current flowing through two adjacent bent portions in a first modification.

In the second embodiment, the outer sensor element 56 may be located at any position as long as the outer sensor element 56 is outside the bent portion 61 in the direction orthogonal to the Y-direction. In first modification, as shown in FIG. 9, an outer sensor element 56 is provided at a position aligned with the inner sensor element 52 in the X-direction. The outer sensor element 56 is provided on the side opposite to the inner sensor element 52 via the opposite-side extending portion 64 in the X-direction, for example. The outer sensor element 56 is at a position separated from the opposite-side extending portion 64 in the X-direction. The outer sensor element 56 is provided between the connecting portion 62 and the base portions 68, 69 in the Z-direction, and is located at a position separated from both the connecting portion 62 and the base portions 68, 69. In the first sensor unit 50, the first outer sensor element 56A detects the first left magnetic flux MA4.

The outer sensor element 56 may be provided on the side opposite to the inner sensor element 52 via the card-side extending portion 63 in the X-direction. For example, the outer sensor element 56 may be at a position separated from the card-side extending portion 63 in the X-direction. In this configuration, in the first sensor unit 50, the first outer sensor element 56 detects the first right magnetic flux MA3.

Third Embodiment

In the first embodiment, in the sensor units 50, the bent portions 61 are linearly arranged in the X-direction. In contrast, in a third embodiment, bent portions 61 of the two sensor units 50 adjacent to each other in the X-direction are provided at positions shifted in the Y-direction. Configurations, operations, and effects not specifically described in the third embodiment are the same as those in the above-described first embodiment. In the third embodiment, differences from the above-described first embodiment will be mainly described.

Figure 10:
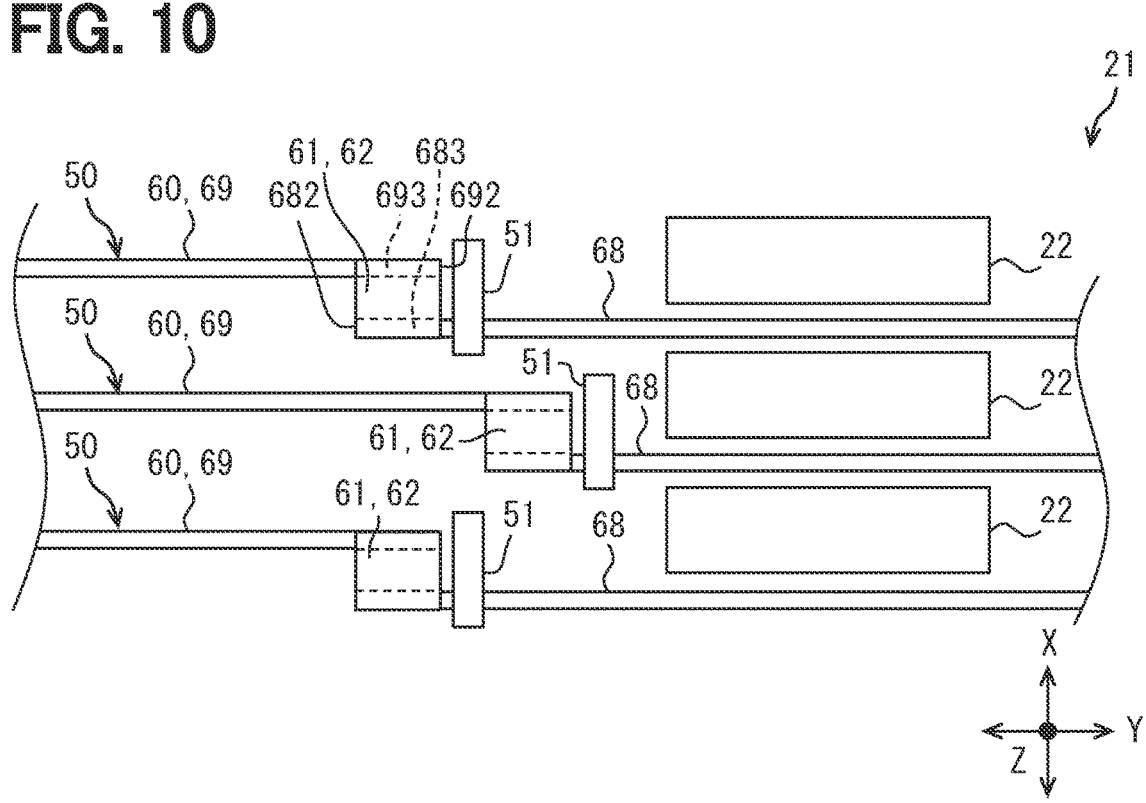
FIG. 10 is a diagram illustrating a configuration of a power unit and a sensor unit according to a third embodiment.

As shown in FIG. 10, in the two sensor units 50 adjacent to each other in the X-direction, the respective bent portions 61 are provided at positions shifted in the Y-direction. The two adjacent bent portions 61 are located at positions separated from each other in the Y-direction. These bent portions 61 are in a positional relationship not overlapping each other in a direction orthogonal to the Y-direction. In the present embodiment, the bent portions 61 arranged in the X-direction are arranged in a zigzag manner so as to be alternately arranged in a staggered manner.

In the sensor units 50, a relative position of the current sensor 51 with respect to the bent portion 61 is the same, and the current sensors 51 and the sensor elements 52 are arranged in the staggered manner. In the two sensor units 50 adjacent to each other in the X-direction, the current sensor 51 and the sensor element 52 are provided at positions shifted in the Y-direction. The current sensor 51 and the sensor element 52 are spaced apart from each other in the Y-direction. The two current sensors 51 adjacent to each other in the X-direction have a positional relationship not overlapping each other in a direction orthogonal to the Y-direction. Similarly, the two sensor elements 52 adjacent to each other in the X-direction have a positional relationship not overlapping each other in a direction orthogonal to the Y-direction.

In two adjacent sensor units 50, one of the current sensor 51 and the sensor element 52 is provided at a position shifted in the Y-direction from the other bent portion 61. That is, one of the current sensor 51 and the sensor element 52 and the other bent portion 61 are in a positional relationship not overlapping each other in a direction orthogonal to the Y-direction. For example, in two adjacent sensor units 50, one current sensor 51 is located between one bent portion 61 and the other bent portion 61 in the Y-direction.

Although illustration is omitted, in the sensor units 50A, 50B, the first bent portion 61A is provided at a position shifted in the Y-direction from the second bent portion 61B. The first bent portion 61A and the second bent portion 61B do not overlap each other in a direction orthogonal to the Y-direction. In this configuration, the first connecting portion 62A is at a position shifted in the Y-direction from the second connecting portion 62B. The first connecting portion 62A and the second connecting portion 62B do not overlap each other in a direction orthogonal to the Y-direction.

According to the present embodiment, the first connecting portion 62A is provided at a position separated from the second connecting portion 62B in both the X-direction and the Y-direction. In this configuration, for example, a separation distance between the first connecting portion 62A and the second connecting portion 62B is as large as possible compared to a configuration in which the first connecting portion 62A and the second connecting portion 62B are not shifted in the Y-direction. Therefore, the connection magnetic flux M1 generated by the electric current flowing through the second connecting portion 62B may be difficult to reach the first connecting portion 62. Therefore, the connection magnetic flux M1 generated by the electric current flowing through the second connecting portion 62B is less likely to increase or decrease in the connection magnetic flux M1 generated by the electric current flowing through the first connecting portion 62A. Accordingly, the detection accuracy of the magnetic flux by the first sensor element 52A can be improved.

As described above, since the connection magnetic flux M1 generated by the electric current flowing through the second connecting portion 62B is less likely to reach the first connecting portion 62A, the first connecting portion 62A and the second connecting portion 62B can be arranged at positions as close as possible in the X-direction. Therefore, the separation distance between the first busbar 60A and the second busbar 60B in the X-direction can be reduced as much as possible. Therefore, an installation space required for installing the busbars 60 can be reduced. Accordingly, a degree of freedom of arrangement of internal devices accommodated inside the case can be improved and the case 20 can be downsized.

Fourth Embodiment

In the first embodiment, the current sensor 51 is provided on one side of the bent portion 61 in the Y-direction. Contrary to this, in a fourth embodiment, at least a part of a current sensor 51 is embedded in the bent portion 61. Configurations, operations, and effects not specifically described in the fourth embodiment are the same as those in the above-described first embodiment. In the fourth embodiment, differences from the above-described first and second embodiments will be mainly described.

Figure 11:
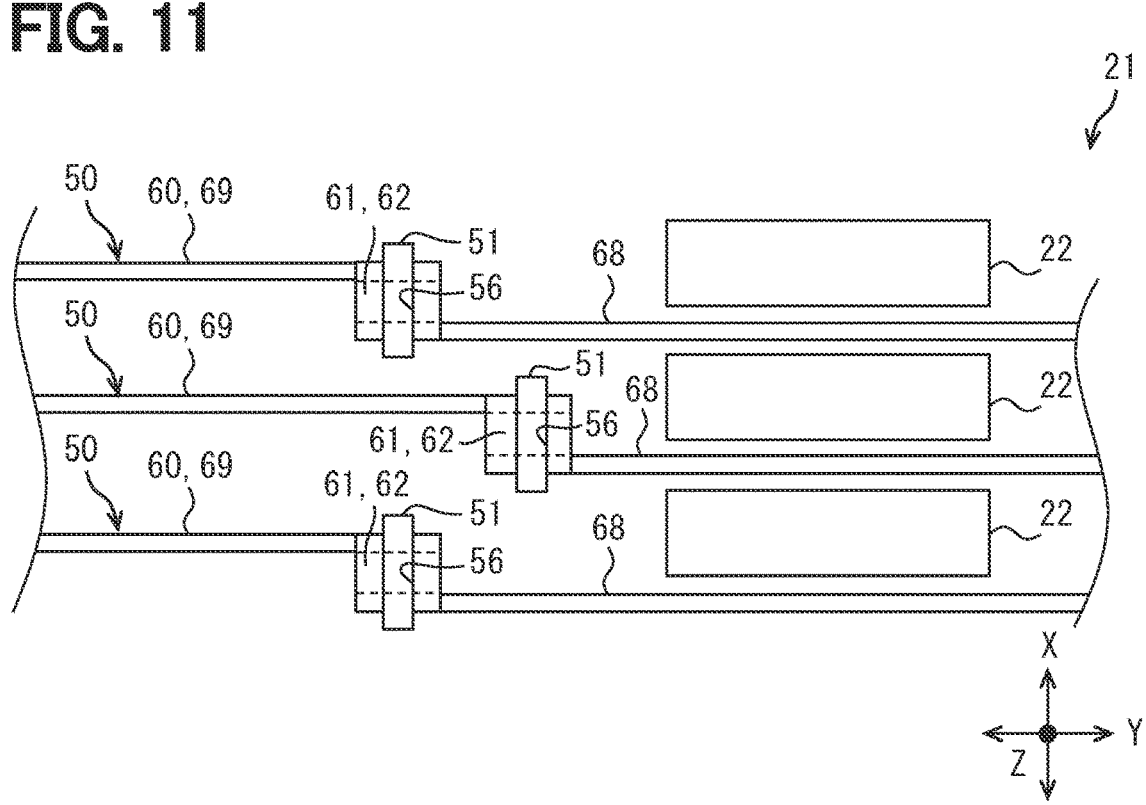
FIG. 11 is a diagram illustrating a configuration of a power unit and a sensor unit according to a fourth embodiment.
Figure 12:
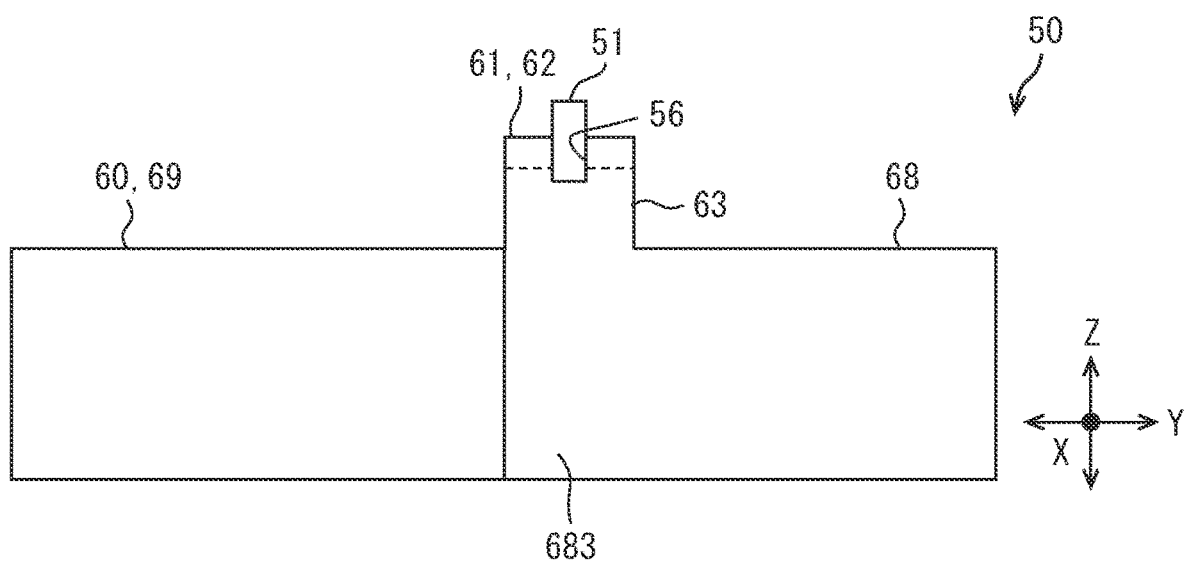
FIG. 12 is a side view of the sensor unit.

As shown in FIGS. 11 and 12, the bent portion 61 has a notch 65. The notch is a recess recessed toward the base portions 68, 69 in the bent portion 61. The notch 65 is arranged at a position spaced inward from both ends of the bent portion 61 in the Y-direction. For example, the notch 65 is located at a center of the bent portion 61 in the Y-direction.

The notch 65 penetrates the connecting portion 62 in the Z-direction. The notch 65 is recessed toward the base portions 68, 69 in the extending portions 63, 64. The notch 65 is in a state of being extended to the card-side extending portion 63 and the opposite-side extending portion 64 via the connecting portion 62 in the X-direction. The notch 65 extends across both ends of the bent portion 61 in the X-direction and are open in the X-direction.

At least a part of the current sensor 51 is embedded in the bent portion 61. For example, at least a part of the sensor main body 53 is embedded in the bent portion 61. The sensor main body 53 enters an inside of the notch 65 from the side opposite to the base portions 68, 69 in the Z-direction. The sensor main body 53 protrudes from the bent portion 61 in the X-direction, but does not protrude from the bent portion 61 in the Y-direction. The notch 65 is a receiving portion that receives the sensor main body 53. The sensor main body 53 is fixed to at least one of an inner surface of the notch 65 and an outer surface of the bent portion 61 by an adhesive, a screw, or the like.

In the sensor units 50, as shown in FIG. 11, the bent portions 61 are arranged in a staggered manner in the same manner as in the second embodiment. As described above, the sensor main body 53 does not protrude from the bent portion 61 in the Y-direction. Therefore, in the sensor units 50, the sensor main bodies 53 are arranged in a staggered manner similarly to the bent portions 61. Since the two bent portions 61 adjacent to each other in the X-direction are separated from each other in the Y-direction, the sensor main bodies 53 embedded in the respective bent portions 61 are in a positional relationship of being separated from each other in the Y-direction.

Although illustration is omitted, in the first sensor unit 50A, the first current sensor 51A is embedded in the first bent portion 61A. The notch 65 provided in the first bent portion 61A is referred to as a first notch 65A. At least a part of the first sensor main body 53A is embedded in the first notch 65A.

According to the present embodiment, the first current sensor 51A is provided in a state in which at least a part of the first sensor main body 53A is embedded in the first connecting portion 62A. Therefore, the first sensor main body 53A can be easily fixed to the first connecting portion 62A. In addition, since the first sensor main body 53A is embedded in the first connecting portion 62A, a positional deviation of the first sensor element 52A with respect to the first connecting portion 62A is less likely to occur. Therefore, a decrease in the detection accuracy of the first internal magnetic flux MA1 detected by the first sensor element 52A can be reduced due to the positional deviation of the first sensor element 52.

Other Embodiments

The disclosure of this specification is not limited to the illustrated embodiment. The disclosure encompasses the illustrated embodiments and variations based on the embodiments by those skilled in the art. For example, the disclosure is not limited to the combinations of components and elements shown in the embodiments, and various modifications and implementations can be performed. The disclosure may be implemented in various combinations. The disclosure may have additional portions that may be added to the embodiments. The disclosure encompasses the omission of parts and elements of the embodiments. The disclosure encompasses replacement or combination of the parts and elements between one embodiment and another. The technical scope disclosed in the present disclosure is not limited to the above-described embodiments. It should be understood that some disclosed technical ranges are indicated by description of claims, and includes every modification within the equivalent meaning and the scope of description of claims.

In each of the above embodiments, a direction in which the sensor elements 52, 56 and the connecting portion 62 are arranged may be the Z-direction instead of the Y-direction as long as a direction is orthogonal to the X-direction which is a specific direction. The detection direction of the sensor elements 52, 56 may be the Z-direction instead of the Y-direction as long as a direction is orthogonal to the X-direction which is the specific direction. Further, the detection direction may be a direction inclined with respect to the Y-direction as long as a direction is orthogonal to the X-direction. For example, an inclination angle of the detection direction with respect to the Y-direction may be in a range of 0 to 45.

In each of the above embodiments, in the sensor units 50, a positional relationship between the sensor element 52 and the bent portion 61 may not be the same. For example, in the two sensor units 50A, 50B, the first sensor element 52A may be provided closer to the first card-side base portion 68A than the first bent portion 61A, and the second sensor element 52B may be provided closer to the second opposite-side base portion 69B than the second bent portion 61B. In the third embodiment, the bent portions 61 may be arranged in a staggered manner, and the current sensors 51 may be arranged in a straight line. Further, in the third embodiment, the bent portions 61 may not be arranged in a staggered manner as long as the first bent portion 61A and the second bent portion 61B are at positions shifted in the Y-direction. Similarly, as long as the first sensor element 52A and the second sensor element 52B are at positions shifted in the Y-direction, the sensor elements 52 may not be arranged in a staggered manner.

In each of the above embodiments, the extending portions 63, 64 may not be included in the busbar 60 as long as the connecting portion 62 extends in the X-direction in the busbar 60. That is, the bent portion 61 may not have the extending portions 63, 64 as long as the bent portion 61 has at least the connecting portion 62. In addition, the connecting portion 62 may not extend linearly in the X-direction as long as the connecting portion 62 extends in the X-direction as a whole, and may be bent so as to expand or recess in a direction orthogonal to the X-direction. Further, the connecting portion 62 may be provided in a direction in which a plate surface of the connecting portion 62 is orthogonal to the Z-direction, or may be provided in a direction in which the plate surface of the connecting portion 62 is orthogonal to the Y-direction.

In each of the above embodiments, the sensor unit 50 may not include all of the busbars 60. For example, the sensor unit 50 may include at least the connecting portion 62 of the busbar 60 and may include at least the bent portion 61. The sensor unit 50 may include at least the connecting portion 62 and the base portions 68, 69 of the busbar 60.

In each of the above embodiments, the vehicle equipped with the electric power conversion device 10 may be, for example, a passenger car, a bus, a construction vehicle or an agricultural machinery vehicle. The vehicle is one of the movable bodies. The movable body equipped with the electric power conversion device 10 may be, for example, a train, an airplane or a ship. The electric power conversion device 10 may be, for example, an inverter device or a converter device. The converter device may be, for example, a power supply device for AC input and DC output, a power supply device for DC input and DC output, and a power supply device for AC input and AC output.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A current detection device configured to detect an electric current, the device comprising:
   a first conducting portion through which a first electric current flows in a specific direction and a second conducting portion through which a second electric current, which is different in phase from the first electric current, flows in the specific direction, the first conducting portion being (i) provided at a position separated from the second conducting portion in the specific direction and (ii) aligned with the second conducting portion in the specific direction; and
   a current sensor configured to detect the first electric current flowing through the first conducting portion, wherein
   the current sensor is located at a position aligned with the first conducting portion in an orthogonal direction orthogonal to the specific direction and separated from the second conducting portion in the specific direction,
   the current sensor includes a sensor element, which is configured to detect a magnetic flux generated by the first electric current flowing through the first conducting portion, and an element protector configured to protect the sensor element, and
   the first conducting portion and the second conducting portion are directly adjacent to each other in the specific direction.

2. The current detection device according to claim 1, wherein
   the sensor element is provided at a position separated from the second conducting portion in the orthogonal direction and the specific direction.

3. The current detection device according to claim 1, wherein
   the first conducting portion is provided at a position separated from the second conducting portion in the orthogonal direction and the specific direction.

4. The current detection device according to claim 1, wherein
   a bent portion has the first conducting portion and a pair of extending portions connected to each other via the first conducting portion,
   a direction orthogonal to both the specific direction and the orthogonal direction is an extending direction,
   the pair of extending portions extends from the first conducting portion in the extending direction,
   the bent portion is bent to bulge out to the first conducting portion, and
   the sensor element is provided at a position closer to the pair of extending portions than the first conducting portion in the extending direction and between the pair of extending portions in the specific direction.

5. The current detection device according to claim 4, wherein
   the sensor element is referred to as an inner sensor element provided inside the bent portion in the orthogonal direction, and
   the current sensor includes the inner sensor element and an outer sensor element provided outside the bent portion in the orthogonal direction and configured to detect a magnetic flux generated by an electric current flowing through the bent portion.

6. The current detection device according to claim 1, wherein
   the current sensor is provided in a state in which at least a part of the element protector is embedded in the first conducting portion.

7. The current detection device according to claim 1, wherein:
   a first conducting part has the first conducting portion and a pair of first base portions connected to each other via the first conducting portion and through which an electric current flows in the orthogonal direction;
   a second conducting part has the second conducting portion and a pair of second base portions connected to each other via the second conducting portion and through which an electric current flows in the orthogonal direction;
   the pair of first base portions extend from the first conducting portion in different directions in the orthogonal direction, and are provided at positions separated from each other in the specific direction via the first conducting portion;
   the pair of second base portions extend from the second conducting portion in different directions in the orthogonal direction, and are provided at positions separated from each other in the specific direction via the second conducting portion; and
   the sensor element is provided such that a detection direction in which the sensor element detects the magnetic flux is the orthogonal direction.

8. The current detection device according to claim 7, wherein
   one of the pair of first base portions and one of the pair of second base portions extend in a same direction in the orthogonal direction and are provided at positions shifted in a same direction in the specific direction with respect to the other of the pair of first base portions and the other of the pair of second base portions.

9. The current detection device according to claim 7, wherein
   a cross-sectional area of the first conducting portion is smaller than a cross-sectional area of each of the pair of first base portions.

10. The current detection device according to claim 7, wherein
    one of the pair of first base portions is provided at a position aligned in the specific direction with respect to a power module,
    the power module has a power element configured to convert electric power supplied from a power supply to an electric load, and
    the first conducting portion is provided at a position aligned in the orthogonal direction with respect to the power module.

11. A current sensor configured to detect an electric current flowing through a first conducting portion through which a first electric current flows in a specific direction, the current sensor being not configured to detect a second electric current, which is different in phase from the first electric current, flowing in the specific direction through a second conducting portion that is (i) provided at a position separated from the first conducting portion in the specific direction, and (ii) aligned with the first conducting portion in the specific direction, the current sensor comprising:
- a sensor element located at a position aligned with the first conducting portion in an orthogonal direction orthogonal to the specific direction and separated from the second conducting portion in the specific direction, the sensor element being configured to detect a magnetic flux generated by the first electric current flowing through the first conducting portion; and
- an element protector configured to protect the sensor element, wherein
- the first conducting portion and the second conducting portion are directly adjacent to each other in the specific direction.

12. An electric power conversion device configured to convert electric power supplied from a power supply to an electric load, the device comprising:
- a first conducting portion through which a first electric current flows in a specific direction;
- a second conducting portion through which a second electric current, which is different in phase from the first electric current, flows in the specific direction, the first conducting portion being (i) provided at a position separated from the second conducting portion in the specific direction and (ii) aligned with the second conducting portion in the specific direction; and
- a current sensor configured to detect the first electric current flowing through the first conducting portion, wherein
- the current sensor is located at a position aligned with the first conducting portion in an orthogonal direction orthogonal to the specific direction and separated from the second conducting portion in the specific direction,
- the current sensor includes a sensor element, which is configured to detect a magnetic flux generated by the first electric current flowing through the first conducting portion, and
- the first conducting portion and the second conducting portion are directly adjacent to each other in the specific direction.

* * * * *